(12) United States Patent
Loeffler et al.

(10) Patent No.: US 10,534,430 B2
(45) Date of Patent: Jan. 14, 2020

(54) DEVICE AND METHOD FOR IMMERSIVE VISUAL REPRESENTATIONS AND INDIVIDUAL HEAD EQUIPMENT

(71) Applicant: THOMSON Licensing, Issy-les-Moulineaux (FR)

(72) Inventors: Siegfried Loeffler, Paris (FR); Gael Seydoux, Noyal sur Vilaine (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/928,789

(22) Filed: Mar. 22, 2018

(65) Prior Publication Data
US 2018/0275754 A1 Sep. 27, 2018

(30) Foreign Application Priority Data
Mar. 23, 2017 (EP) .................................... 17305331

(51) Int. Cl.
*G06F 3/01* (2006.01)
*G06T 19/00* (2011.01)
(Continued)

(52) U.S. Cl.
CPC ............ *G06F 3/013* (2013.01); *G06T 15/005* (2013.01); *G06T 19/003* (2013.01); *G06T 19/006* (2013.01)

(58) Field of Classification Search
CPC .. G06K 9/00664–00704; G06F 3/0481; G06F 3/04817; G06F 9/4443;
(Continued)

(56) References Cited

U.S. PATENT DOCUMENTS

| 5,606,458 A | * | 2/1997 | Fergason ........... G02B 27/0172 |
| | | | 359/630 |
| 5,724,775 A | | 3/1998 | Zobel et al. |

(Continued)

FOREIGN PATENT DOCUMENTS

| FR | 2889754 | 2/2007 |
| GB | 2364874 | 2/2002 |

(Continued)

OTHER PUBLICATIONS

Iwata, H., "Floating Eye", 2001 Prix Ars Electronica, Interactive Art, Honorary Mention, 2001, p. 1.

(Continued)

*Primary Examiner* — Todd Buttram
(74) *Attorney, Agent, or Firm* — Brian J. Dorini; Patricia A. Verlangieri

(57) ABSTRACT

A device for immersive visual representations to a user of virtual scenes, inside a helmet enabling head movements, receives information related to positions of the user's eyes with respect to the helmet, determines visual generation parameters of the virtual scenes in function of that information, and provides those parameters for carrying out the immersive visual representations in the helmet based on those parameters. The device further determines the visual generation parameters so as to spatially adjust continuously the representations of the virtual scenes in function of the positions of the user's eyes. An individual head equipment comprises such a device, a helmet, at least one visual generation apparatus, and one or more sensor(s) providing the positions of the user's eyes.

14 Claims, 7 Drawing Sheets

(51) Int. Cl.
*G06T 15/00* (2011.01)
*H04N 13/39* (2018.01)
*H04N 13/344* (2018.01)
*H04N 13/332* (2018.01)
*H04N 13/363* (2018.01)
*H04N 13/366* (2018.01)
*H04N 13/383* (2018.01)

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | | |
|---|---|---|---|---|
| 5,856,811 | A * | 1/1999 | Shih | A42B 3/042 345/8 |
| 7,542,210 | B2 * | 6/2009 | Chirieleison, Sr. | G02B 27/0093 345/8 |
| 8,046,719 | B2 | 10/2011 | Skourup et al. | |
| 9,508,195 | B2 | 11/2016 | Heuvel et al. | |
| 2002/0030888 | A1 * | 3/2002 | Kleinberger | G02B 27/2207 359/465 |
| 2008/0206720 | A1 | 8/2008 | Nelson | |
| 2015/0206351 | A1 | 7/2015 | Abercrombie et al. | |
| 2015/0350628 | A1 | 12/2015 | Sanders et al. | |
| 2016/0011418 | A1 * | 1/2016 | Dopilka | G02B 27/0172 345/8 |
| 2016/0282626 | A1 | 9/2016 | Border et al. | |
| 2017/0156965 | A1 * | 6/2017 | Geisinger | G16H 50/20 |
| 2017/0221273 | A1 * | 8/2017 | Haseltine | G06F 3/013 |
| 2018/0075653 | A1 * | 3/2018 | Schillings | G06T 19/006 |
| 2018/0095532 | A1 * | 4/2018 | Cheng | G06F 3/013 |
| 2018/0137714 | A1 * | 5/2018 | Schmidt | G06F 3/017 |
| 2018/0188542 | A1 * | 7/2018 | Waldern | G02B 27/0172 |
| 2018/0316939 | A1 * | 11/2018 | Todd | H04N 21/2365 |

FOREIGN PATENT DOCUMENTS

| | | |
|---|---|---|
| GB | 2413717 | 11/2005 |
| JP | H06289772 | 10/1994 |
| WO | WO2007017595 | 2/2007 |
| WO | WO2015169889 | 11/2015 |

OTHER PUBLICATIONS

Okumura et al., "72.4: Hyperreality Head Dome Projector (HDP) using LED Light Source", Society for Information Display, vol. 37, No. 1, Jun. 2006, pp. 2003-2006.

Whelan, D., "2006 Toshiba Head Dome Projector", Virtual Reality History, http://www.virtualrealityreviewer.com/category/vr-history/, Mar. 7, 2014, p. 1.

Okumura et al., "Monocular Hyperrealistic Virtual and Augmented Reality Display", IEEE 4th International Conference on Consumer Electronics, Berlin, Germany, Sep. 7, 2014, pp. 19-23.

* cited by examiner

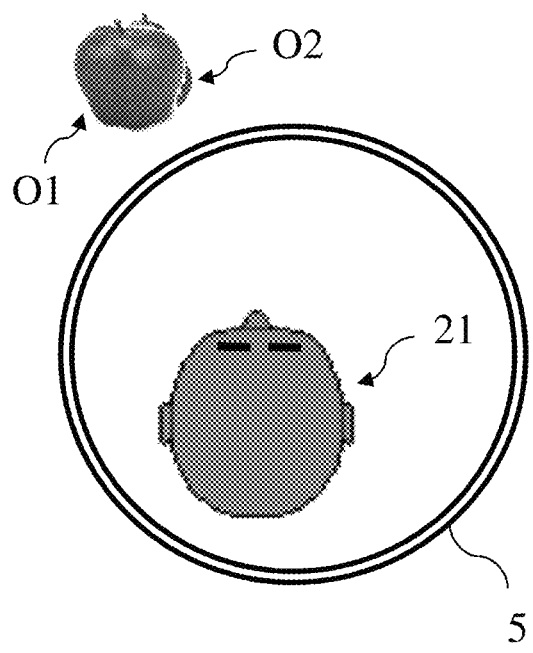
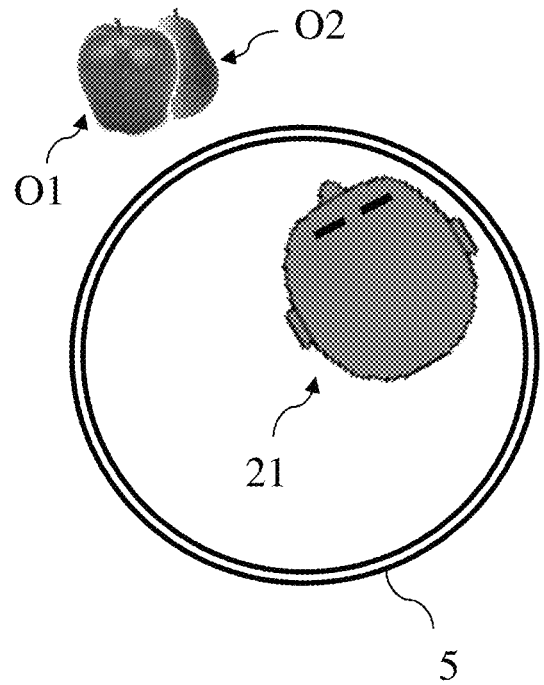
Fig 6A
Fig 6B
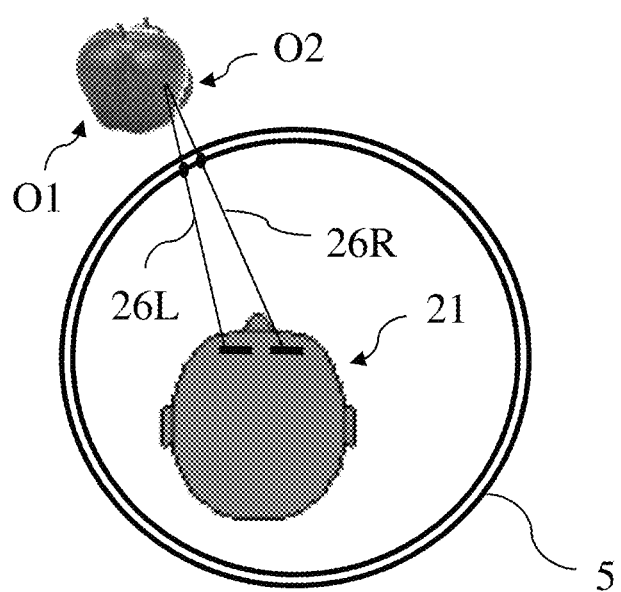
Fig 6C

DEVICE AND METHOD FOR IMMERSIVE VISUAL REPRESENTATIONS AND INDIVIDUAL HEAD EQUIPMENT

1. REFERENCE TO RELATED EUROPEAN APPLICATION

This application claims priority from European Patent Application No. 17305331.5, entitled "DEVICE AND METHOD FOR IMMERSIVE VISUAL REPRESENTATIONS AND INDIVIDUAL HEAD EQUIPMENT", filed on Mar. 23, 2017, the contents of which are hereby incorporated by reference in its entirety.

2. TECHNICAL FIELD

The invention relates generally to representative techniques using Virtual Reality (VR) and Augmented Reality (AR) or Mixed Reality (MR), and more particularly to techniques providing an immersive visual representation using VR/AR/MR technology. It is relevant to VR, AR or MR content consumption as well as to VR, AR or MR content post production.

The invention has applications notably in the fields of game or teaching simulations, 3D immersive video projections, remote information sharing, and videoconference.

3. BACKGROUND ART

When consuming 360° video content, whether in 2D or in 3D, a usual solution consists in wearing a dedicated VR headset. However, such a headset is not adapted to an extended use, due to a quickly growing feeling of discomfort associated with an isolation from the environment.

This constitutes a serious threat to the growth of new immersive content consumption. In particular, consumers are not likely to be willing to wear a VR headset during the full length of a movie.

In addition, that issue is important in post-production, too. Indeed, people have then to spend significant time per day wearing such a headset. A current alternative consists in projecting a 360° immersive content onto a standard flat screen exploited for editing and color grading. While that practice removes the burden of wearing a VR headset, a significant drawback is that the editing process is carried out on contents that are not representative of the final views.

Having a comfortable immersive VR representation thus appears as a high-stake challenge today.

4. SUMMARY

A purpose of the present disclosure is to provide a VR user with an enhanced immersion feeling, closer to the perception of a real environment.

Another potential advantage of the disclosure is a solution possibly leaving high movement flexibility to the user, especially head movements, notably compared with traditional HMDs (Head-Mounted Devices).

The disclosure is also directed to potentially offering to the user a time-extended comfort feeling, which may notably be acceptable for the watching of complete VR movies.

In this respect, an object of the present disclosure is notably a device for immersive visual representations to a user of at least one virtual scene inside a helmet, the latter enabling head movements of the user in the helmet while being configured to be jointly moved by movements of said user. That device comprises at least one processor configured for:
  receiving information related to positions of the user's eyes in the helmet with respect to the helmet,
  determining visual generation parameters of the virtual scene(s) in function of the information related to the positions of the user's eyes with respect to the helmet, the visual generation parameters being adapted to represent the virtual scene(s) seen by the user in the helmet,
  providing the visual generation parameters for carrying out at least one of the immersive visual representations of the virtual scene(s) in the helmet based on the visual generation parameters.

5. LIST OF FIGURES

The present disclosure will be better understood, and other specific features and advantages will emerge upon reading the following description of particular and non-restrictive illustrative embodiments, the description making reference to the annexed drawings wherein:

FIGS. 6A, 6B and 6C show major visual representation effects taken into account with the system of FIG. 1;

Figure 1:
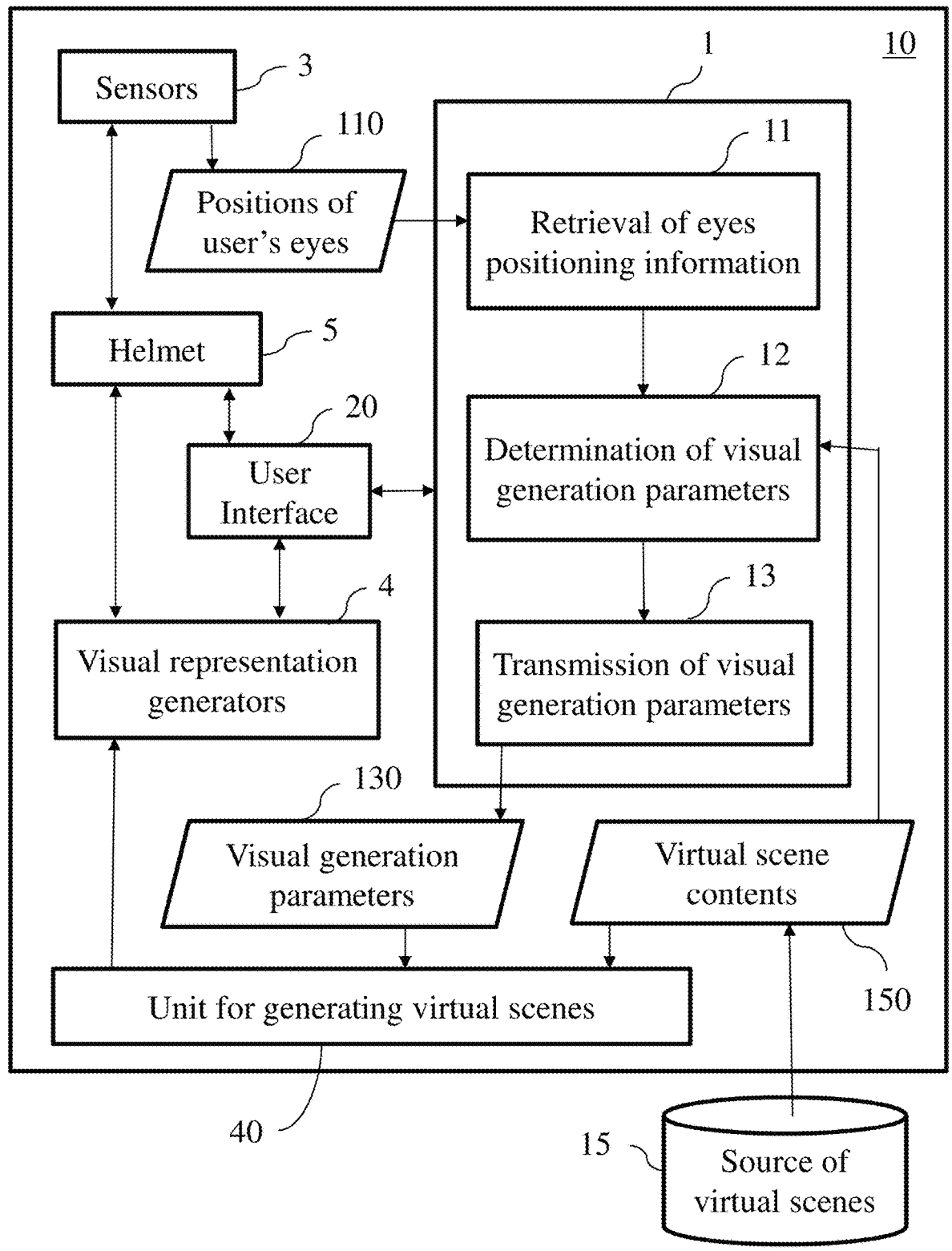
FIG. 1 is a block diagram representing schematically a system for immersive visual representations of virtual scenes, comprising an individual head equipment for immersive visual representations compliant with the present disclosure.
Figure 9:
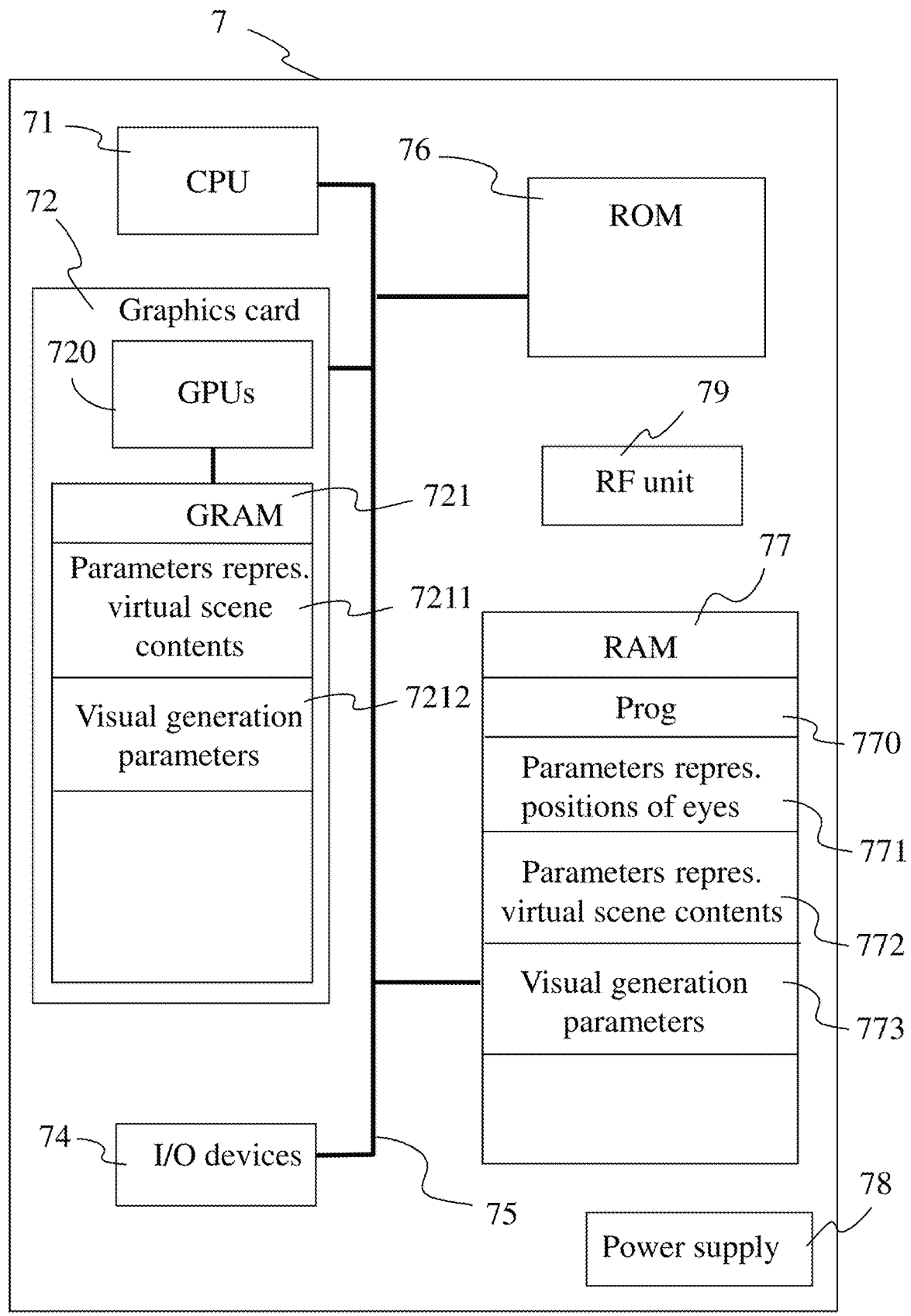

FIG. 9 diagrammatically shows an apparatus for immersive visual representations, adapted to the system of FIG. 1 and corresponding to a device for immersive visual representations compliant with the present disclosure.

6. DESCRIPTION OF EMBODIMENTS

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The terms "adapted" and "configured" are used in the present disclosure as broadly encompassing initial configuration, later adaptation or complementation of the present device, or any combination thereof alike, whether effected through material or software means (including firmware).

The functions of the various elements shown in the figures may be provided through the use of dedicated hardware as well as hardware capable of executing software in association with appropriate software. When provided by a processor, the functions may be provided by a single dedicated processor, a single shared processor, or a plurality of individual processors, some of which may be shared. Moreover, explicit use of the term "processor" should not be construed to refer exclusively to hardware capable of executing software, and refers in a general way to a processing device, which can for example include a computer, a microprocessor, an integrated circuit, or a programmable logic device (PLD). Additionally, the instructions and/or data enabling to perform associated and/or resulting functionalities may be stored on any processor-readable medium such as, e.g., an integrated circuit, a hard disk, a CD (Compact Disc), an optical disc such as a DVD (Digital Versatile Disc), a RAM (Random-Access Memory) or a ROM memory. Instructions may be notably stored in hardware, software, firmware or in any combination thereof.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present disclosure will be described in reference to a particular functional embodiment of a system 10 for providing a user with immersive visual representations of virtual scenes, as illustrated on FIG. 1.

The system 10 comprises several elements including:
- a helmet 5 to be worn by the user, sufficiently spacious for the user to be able to make head movements inside it and with respect to it;
- sensors 3 adapted to capture information related to the positions of the user's eyes in the helmet 5;
- visual representation generators 4 adapted to represent virtual scenes to the user in the helmet 5;
- a unit 40 for generating virtual scenes to be represented by the visual representation generators 4;
- a device 1 for immersive visual representations, adapted to receive from the sensors 3 information 110 on the positions of the user's eyes with respect to the helmet 5, to determine visual generation parameters 130 of virtual scenes in function of those positions and to provide those parameters 130 to the unit 40 with a view to representing those virtual scenes to the user in the helmet 5 by the visual representation generators 4.

The virtual scenes represented by the system 10 have contents 150 provided by one or more external source(s) 15, which can consist in storage resources. The latter can be available from any kind of appropriate storage means, which can be notably a RAM or an EEPROM (Electrically-Erasable Programmable Read-Only Memory) such as a Flash memory, possibly within an SSD (Solid-State Disk). In variants, the external source 15 relies on direct transmission, such as e.g. streaming.

The virtual scene contents 150 include substantial information required for generating the virtual scenes, in function of the positions of the user's eyes. Those contents are preferably providing 3D information on an environment, which can include images over 360 degrees together with associated depth maps. They are advantageously coded in an object-oriented language, well suited to flexible adaptations of representations. They include e.g. a movie, a video game and/or a light field.

The immersive virtual scene contents 150 can further be static (such as a fixed 3D scene) or dynamic (such as a video).

The various parts of the system 10 will be developed below.

The device 1 is advantageously an apparatus, or a physical part of an apparatus, designed, configured and/or adapted for performing the mentioned functions and produce the mentioned effects or results. In alternative implementations, the device 1 is embodied as a set of apparatus or physical parts of apparatus, whether grouped in a same machine or in different, possibly remote, machines.

In a first kind of implementations, the device 1 is integrated in an apparatus outside the helmet 5, e.g. as an application software installed on a computer. In a second kind of implementations, the device 1 is located inside the helmet 5, preferably at the upper internal space.

The device 1 comprises a module 1 for retrieving eye positioning information 110 from the sensors 3, a module 12 for determining the visual generation parameters 130 and a module 13 for transmitting those parameters 130 to the unit 40.

Those modules are to be understood as functional entities rather than material, physically distinct, components. They can consequently be embodied either as grouped together in a same tangible and concrete component, or distributed into several such components. Also, each of those modules is possibly itself shared between at least two physical components. In addition, the modules are implemented in hardware, software, firmware, or any mixed form thereof as well. They are preferably embodied within at least one processor of the device 1.

The helmet 5 is preferably connected to the user's body, while leaving an internal freedom of movements to the user's head. That freedom of movements includes notably at least some of, and advantageously all of: head rotations to the right and to the left, as well as upwards and downwards, head tilting to the right and to the left, as well as forwards and backwards, and head translations forwards and backwards.

In a first advantageous category of embodiments, the helmet 5 is supported by the user's shoulders. It comprises then e.g. supporting side flanges or a supporting surrounding flange, mounted on a helmet main body. In variants, the helmet 5 is attached to the user's body by other parts, and can be in particular carried by a panel fixed over the user's back.

That first category of embodiments allows a quite flexible exploitation of the system 10, which can possibly work in any place without any specific installation.

In a second advantageous category of embodiments, the helmet 5 is hold and hung by a maintaining system linked to a ceiling or to a supporting stand or bar (such as e.g. a living room lamp arranged next to a sofa), for example by one or more cords, ropes, cables and/or chains fastened to the helmet core by one or more fasteners. Preferably, the helmet 5 comprises then one or more cooperation parts, guiding movements of the helmet 5 in function of movement of the user's body. For example, the main body of the helmet 5 is provided with one or more linking flanges that can be rigidly attached to the user's shoulders. In another example, the helmet 5 is provided with armlets adapted to be fastened to the user's arms.

Advantageously, horizontal displacements of the helmet 5 are allowed, which can be obtained e.g. by a slider in a rail attached to the ceiling and guiding movements of one or more cords, ropes, cables and/or chains holding the helmet 5. The presence of one or more pulleys further allows vertical positioning adjustments, while possibly facilitating horizontal displacements.

In a variant embodiment, the helmet 5 is suspended by a rigid bar articulated to a carrying apparatus and linked to the helmet 5 by a pivot joint provided on the latter. In other variants, the helmet 5 is integrated in a piece of furniture, such as in particular a chair or a sofa, or is carried by a drone.

In the second category of embodiments, most of the weight of the helmet 5 and associated equipment is carried by suspension or hanging, which can significantly reduce pressures on the user's body, notably shoulders. Movements around in a room or other space can anyway still remain possible for the user.

The helmet 5 is advantageously dome shaped or ball shaped, and preferably spherical. In variants, it has a cylindrical shape. It comprises an internal wall which is configured for visual projections. The internal wall is for example formed from several projection surfaces assembled together. In variants, which can be combined with the previous embodiment, the internal wall constitutes an adapted background for foreground hologram representations inside the helmet 5. The latter plays then a role of a receptacle for holographic representations.

In further variants, the helmet 5 is adapted to the representation of AR or MR projections, relying on an overlay of a real scene and CG contents, optionally including the additional presence of holograms.

The helmet 5 is advantageously provided with a glass screen adapted to cooperate with the generators 4. Other materials are exploited in variants, such as notably polymers.

According to particular embodiments in which the internal wall of the helmet 5 is used as a projection screen:
 the internal wall is made of a curved glass that has a tunable opacity;
 the internal wall is made of a polymer material;
 the helmet 5 has a wall comprising a transparent core and a covering polymer dispersed liquid crystal film (smart glass), adapted to be opaque or transparent in function of an electric control; this enables the user to remain in relation with the environment without having to take off the helmet 5.

The use of a semitransparent projection screen material can be particularly interesting for AR or MR applications.

In other embodiments, a screen is formed inside the helmet 5 in the form of vapor, smoke or water.

The dimensions of the helmet 5 are advantageously such that a distance between the user's eyes for a vertical head position (possibly rotated) and the internal wall of the helmet 5 is comprised between 6 cm and 20 cm, and still more advantageously between 8 cm and 15 cm. For a spherical shape of the helmet 5, the latter has accordingly a diameter advantageously comprised between 16 cm and 35 cm, and still more advantageously between 18 cm and 33 cm.

However, in variant implementations in which the helmet 5 is preferably suspended or hanged and in which the associated controlling functions are external to the helmet 5, the latter can be much bigger. Using light material, such as e.g. plastic sheets sustained by bent metal stems carrying low weight picoprojectors, the diameter of the helmet 5 can reach up to 180 cm and even 330 cm. Though this is of course inconvenient for large user movements and restricts the displacement possibilities—specially when multiple users are in a same area, such implementations can offer a high immersive visual comfort while still allowing the user to control helmet movements.

In particular embodiments, the helmet 5 is configured to be possibly contracted by the user to a smaller size, e.g. by being made of a retractable material associated with maintaining fasteners, or by being formed from superimposed slates. The user is thereby enabled to adjust the dimensions of the internal wall and internal helmet space in function of a desired degree of comfort and/or of an extent of scene overview. The choice can in particular be made in function of the represented virtual scenes.

In particular embodiments, the helmet 5 has a height-adjustable lower part, which enables to modify the dimensions of its internal wall (which can form a curved screen) and space used for visual representations. In some implementations, this lower part has a winding, a rolling, a tile sliding and/or a telescopic mechanism. This allows the user to see in an adjustable way the lower part of his/her body, his/her hands and part of the real environment. This can be useful for example for postproduction purposes.

In other particular embodiments, the helmet 5 is provided with an internal width-adjustable projection screen, which enables to expand more or less the projection surface, e.g. for covering an angular opening comprised between 120 and 360 degrees. The choice can be made by the user in particular in function of the desired isolation level.

In variants, the helmet 5 or its internal wall has an adjustable global size, which can allow a variation of a corresponding internal radius, and thereby a tuning of the projection surface with respect to the user's head.

The size adjustments above can be manually and/or electrically controllable.

The sensors 3 are preferably able to assess in real time the positions of the user's eyes, and still more advantageously the positions and directions of the eye pupils. In particular embodiments, this is made, in an approximated way, by determining the user's head position and tilt.

In some implementations, the sensors 3 are arranged at a strategic centralized place, e.g. at the top of the internal part of the helmet 5. In other implementations, they are distributed inside the helmet 5.

In particular modes, the sensors 3 include infrared cameras positioned over the internal helmet wall, which are adapted to track the user's pupils. This is advantageously exploited to take account of a convergence or divergence of the user's eyes.

In other embodiments, the sensors 3 include one or more fixed cameras following the user's head movements, including at least the head's position and tilting. The positions of the eyes are then derived from the obtained information, taking e.g. a standard average inter-eye distance into account.

Advantageously, the exploited cameras are stereo cameras. In particular implementations, the presence of one or more cameras inside the helmet 5 is further used for telepresence VR services, which are not possible with current VR headsets.

In alternative embodiments, which can be combined with the previous ones involving cameras, the sensors 3 comprise one or more monitoring elements carried by the user, which are preferably small and light. They can consist in tracking markers—(preferably volume markers) arranged on glasses worn by the user. The markers are advantageously provided with infrared LEDs (for Light-Emitting Diodes), powered by an accumulator integrated in the arms of the glasses.

The monitoring elements can alternatively include miniaturized gyroscopic sensors, carried on the user's head. Such gyroscopic sensors can be integrated in glasses worn by the user. The sensors 3 can then communicate measurement data to the device 1 via wireless transmissions, such as e.g. Bluetooth. In other variants, the sensors 3 are coupled with contact lenses worn by the user, and include a wireless transmission system (e.g. via Bluetooth) integrated in the lenses.

The unit 40 for generating virtual scenes can have various implementations, and is to be understood as a functional entity rather than a material, physically distinct, component. It can consequently be embodied in a single tangible and concrete component, or shared between at least two physical components. In addition, it is implemented in hardware, software, firmware, or any mixed form thereof as well.

Preferably, the unit 40 is embodied in a graphics card. In advantageous embodiments, the unit 40 is implemented in a dedicated apparatus, coupled with the device 1. In other embodiments, the unit 40 is combined with the device 1 in a single apparatus, while being preferably embodied within at least one processor of the device 1. In still other embodiments, it is combined with the generators 4 in one or more common apparatus.

The generation unit 40 is configured for determining the visual representations in function of the visual generation parameters 130 and from the virtual scene contents 150, by computing the appropriate images and/or holograms. Preferably, that determination takes account of occlusions and/or obstructions and/or comprises inpainting operations, e.g. when the user's head makes a forward or backward movement in the helmet 5. It is adapted to transmit those representations to the generators 4 for carrying out the representations of the virtual scenes in the helmet 5.

The device 1 and unit 40 are preferably configured for acting in a combined way in real time, so as to adapt continuously the scene generation to the current relative positions of the user's eyes at any moment.

The visual representation generators 4 are configured for generating the visual representations inside the helmet 5 from the inputs from the generation unit 40, preferably in real time, by image projections over the internal helmet wall, display of holograms, light field rendering and/or 3D visualization. Preferably, the generators 4 are located at an upper central position inside the helmet 5.

In particular embodiments, the generators 4 are further including a system for guiding the projection light so as to enable images to be formed at the internal periphery of the helmet 5 with corrections of the optical, colorimetric and/or adjustment distortions.

In the implementations in which the helmet 5 has an adjustable internal size, the generators 4 and the generation unit 40 are advantageously configured for adapting the generation of the visual representations to modifications of that internal size. Also, they are preferably configured for generating stitched images on the internal projection wall of the helmet 5.

In advantageous embodiments, the visual representation generators 4 are adapted to stereoscopy, preferably with an active shutter system. The user is then provided with dedicated enveloping glasses (i.e. curved glasses covering each eye, thereby avoiding disturbing interferences between the left and right views) or contact lenses, enabling to display images for alternately the user's right eye and left eye at a high speed. This makes possible a significant strengthening of the immersion sensation to the user, while preferably taking account of parallax effects.

As regards glasses, the distance between the eyes can be personalized by mechanical adjustment. A micro-USB connection is also advantageously provided on the glasses for recharging the shutter system. In an alternative, a rechargeable battery is arranged on the glasses. That battery is powered regularly for operating the shutter system (and possibly for operating diodes directed to eye position monitoring, as mentioned above).

As for contact lenses, they may be corrective with respect to the user's vision. Also, they comprise advantageously an integrated shutter microsystem, which can be remotely powered. That powering can be obtained by technologies known by the person skilled in the art of wireless power transfer, such as near field power transfer by inductive coupling. A corresponding reception antenna connected to the shutter microsystem of the contact lenses (e.g. similar to DC current—DC for Direct Current—collecting part of RFID tags—for Radio-Frequency Identification) can for example be arranged above the user's ears. Achievements regarding appropriate contact lenses can e.g. be found in the article "Hydrophilic Organic Electrodes on Flexible Hydrogels" to T. Moser et al., *ACS Appl. Mater. Interfaces*, 8 (1), pp. 974-982, 2016.

A calibration of the generation unit 40 and/or generators 4 related to the distance between the eyes is advantageously effected. Such a calibration is desirable with glasses as well as with contact lenses. The calibration is advantageously executed at a setup phase when starting a session, before the user puts on the glasses or the lenses, or before the eyes are tracked.

In some modes of the visual representation generators 4 dedicated to holography, they include one internal picoprojector, or two or more picoprojectors distributed inside the helmet 5 in a manner known to a person skilled in the art. Advantageously, the internal space inside the helmet 5 is then provided with a dedicated gas or with water fog, adapted to capture the visual representations. In advantageous related implementations, the gas or water fog is regularly fed into a bottom feeding part of the helmet 5 from a (preferably portable) tank, while one or more upper openings of the helmet 5 enable the gas or water fog to slowly escape. In other advantageous related implementations, the helmet 5 is provided with an inside transparent insulation wall, separated from the inner wall of the helmet 5 by an area adapted to receive and keep the gas or water fog. In this way, the gas or water fog can stay inside the helmet without disturbing the user by a direct contact with his/her face.

In particular implementations involving projectors, deformations introduced by projector lenses and by the geometry of the internal wall of the helmet 5 are corrected by a software module, which can be part of the generators 4 and/or of the generation unit 40.

In enhanced versions, the generators 4 and the generation unit 40 are configured for generating images projected over the internal wall of the helmet 5 together with holograms. This can provide to the user a still stronger sensation of presence of the objects represented with the holograms.

In particular implementations, the system 10 further comprises a binaural or spherical audio set, which can create a spatialized sound in the form of an immersive sound field. This enhances the immersion sensation offered to the user in audiovisual experiences through a realistic simulation of the real vision.

The helmet 5 accommodates advantageously small audio speakers distributed internally. In alternative implementations, the audio set comprises audio speakers arranged outside, and possibly remote from, the helmet 5.

In particular embodiments, the generated sound field depends on the user's head location. In this respect, information is advantageously transmitted to the audio set about the position of the user's ears and/or head, and the audio set is adapted to derive therefrom good sound spatialization. In this respect, one or more trackers or cameras are advantageously exploited for transmitting the position and direction of the user's ears and/or head to the audio set, so that the audio balance can be tuned in an appropriate way for sound spatialization.

Audio data are preferably transmitted together with visual data for synchronized audio and visual representations in the helmet 5—whether projected images or holograms. A co-transmission can rely on any appropriate encoding format.

The system 10 further comprises a user interface 20 interacting with the device 1, the sensors 3, the generators 4, and/or the unit 40, via which information can be entered and retrieved by the user (for sake of convenience only, the relationships with the sensors 3 and the unit 40 are not represented on FIG. 1). The user interface 20 includes any means appropriate for entering or retrieving data, information or instructions, notably visual, tactile and/or audio capacities that can encompass any or several of the following means as well known by a person skilled in the art: a screen, a keyboard, a trackball, a touchpad, a game pad, a touchscreen, a loudspeaker, a voice recognition system, a movement recognition system (e.g. by hand or foot movement capture).

The user interface 20 is advantageously adapted to adjust visual representation parameters and to proceed with various settings. In particular implementations, it is adapted to present to the user 2D and/or 3D objects superimposed over the virtual scene.

Interactions between the user and the system 10 via the user interface 20 can apply notably to the adjustment of a distance to the inner wall of the helmet 5, the opacity of the helmet wall, the height and/or width adjustment of the inner wall of the helmet 5, the colorimetry of the whole scene, the luminosity of the whole scene, the contrast of the whole scene, the audio volume and settings and/or the definition of the whole scene (e.g. High Definition or Standard Definition).

The cameras, trackers, glasses, lenses, gyroscopic systems, etc. mentioned above about different parts of the system 10 are advantageously the same ones, being exploited for two or more distinct functional tasks.

The system 10 is configured for a continuous spatial adjustment of the immersive visual representations of virtual scenes in function of the positions of the user's eyes, which concerns in particular the device 1, the generation unit 40, and the representation generators 4, but is also relevant to the sensors 3.

The "continuous" spatial adjustment of a visual representation of a given virtual scene (a virtual scene being defined as a set of inter-dependent CG objects associated or not with CG effects) at a given time is to be understood as follows.

First, it means that any considered movement of one of the user's eyes, or of both eyes, triggers an adjustment of the visual representation of the same virtual scene. A "considered movement" is an eye movement that is taken into consideration based on the functionalities present in the system 10. For example, if only head monitoring is exploited for assessing eye positions, part of the eye movements are disregarded by the system 10. Also, the spatial adjustment applies to a same given virtual scene, not e.g. to time representations of successive virtual scenes in a video.

Secondly, the continuity of the spatial adjustment in function of the eye positions excludes spatial block modifications, e.g. switching to a different view of the same virtual scene when the user turns his/her head to the right or to the left. The notion of "continuous spatial change" with regard to "block spatial change" makes sense with reference to the user's perception. Namely, if discontinuities exist in the spatial adjustments but are small enough to be imperceptible by the user, the continuity is deemed effective. In fact, such small discontinuities generally happen in practice, due to the presence of elementary representation blocks at a sufficiently fine scale.

More precisely, given the somewhat subjective aspect of the above approach, the angular measure of any adjustment discontinuity as perceived from a rest position of the eyes in the helmet 5 is preferably lower than 0.5 degree, advantageously lower than 0.1 degree, and still more advantageously lower than 0.01 degree.

The continuous spatial adjustment of the visual representations of the virtual scenes is preferably effected with individual parallax correction, which can make the representations significantly more realistic.

In execution, if the user turns his head vertically, images or holograms inside the helmet 5 do not have to move (contrary to current VR headsets). Also, if the user tilts his head or makes lateral or back and forth head movements, the images or holograms are adapted accordingly.

The system 10 can be relevant to private applications as well as to professional applications, and can make possible to the user an immersive experience close to the real life.

Practical examples described below will provide the reader with a completed view of the developed solutions.

Figure 2:
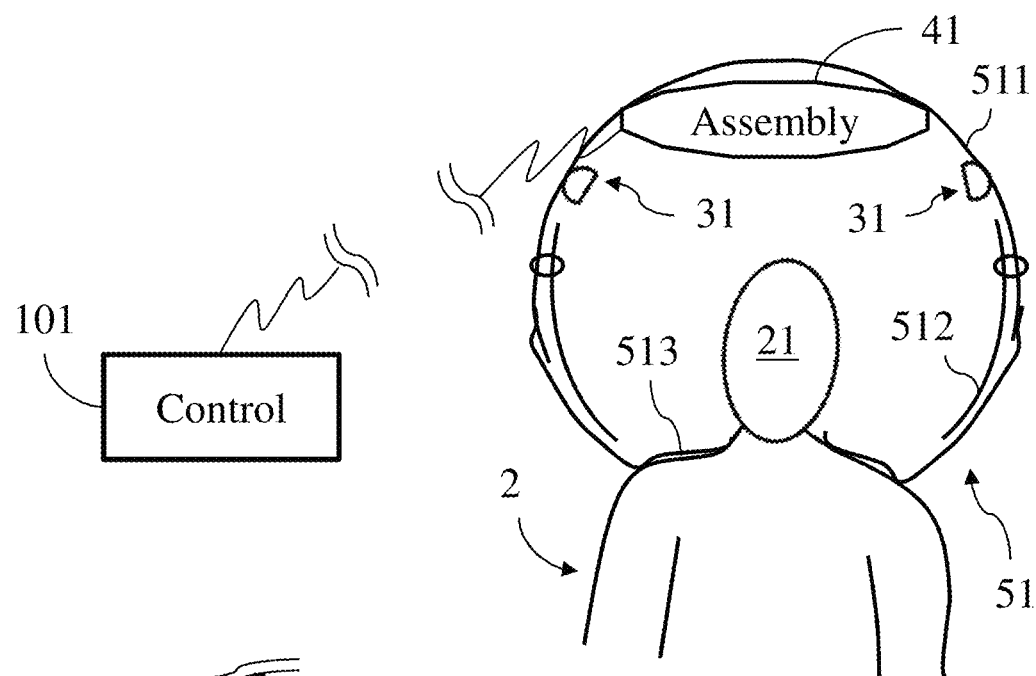
FIG. 2 illustrates a first example of the system of FIG. 1.

As illustrated on FIG. 2, a helmet 5 noted 51 is carried over the shoulders of a user 2 by means of flanges 513. The user's head 21 can move freely inside the helmet 51. The latter further comprises a main fixed upper part 511 and a height adjustable lower part 512, which allows to obtain a desired internal size of the helmet 51.

An assembly 41 of picoprojectors and cameras is arranged at the upper internal part of the helmet 51, and communicates in a wireless way with an external control apparatus 101. Those picoprojectors correspond to the visual representation generators 4, while those cameras correspond to the sensors 3.

In addition, small lateral captors 31 are distributed inside the helmet 5, and provide monitoring functions corresponding to the sensors 3 and completing the cameras belonging to the assembly 41. They are themselves provided with transmission capabilities, either via wired or wireless communications with the assembly 41, or via wireless transmissions to the control apparatus 101.

The control apparatus 101 has computing capabilities corresponding to the device 1 for immersive visual representations and to the generation unit 40. The desired visual scene contents 150 are available to that apparatus 101.

Figure 3:
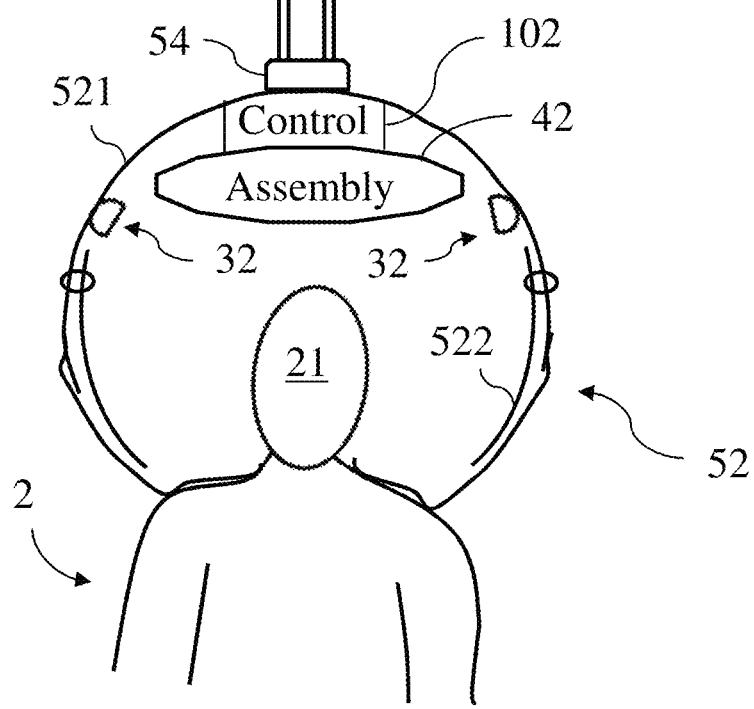
FIG. 3 illustrates a second example of the system of FIG. 1.

In another example represented on FIG. 3, the helmet 5 noted 52 is hung by cords 55 at a dedicated fastening element 54 of the helmet 5. An assembly 42 of picoprojectors and cameras is arranged in the internal upper part of the helmet 52 and completed with small lateral captors 32, and the helmet 52 comprises a main fixed upper part 521 and a height adjustable lower part 522, in a similar way as in the example of FIG. 2. However, by contrast, a control apparatus 102 (having functions similar to those of the control apparatus 101) is coupled to that assembly 42 inside the helmet 52. The control apparatus 102 and the assembly 42 are preferably communicating in a wired way.

Figure 4:
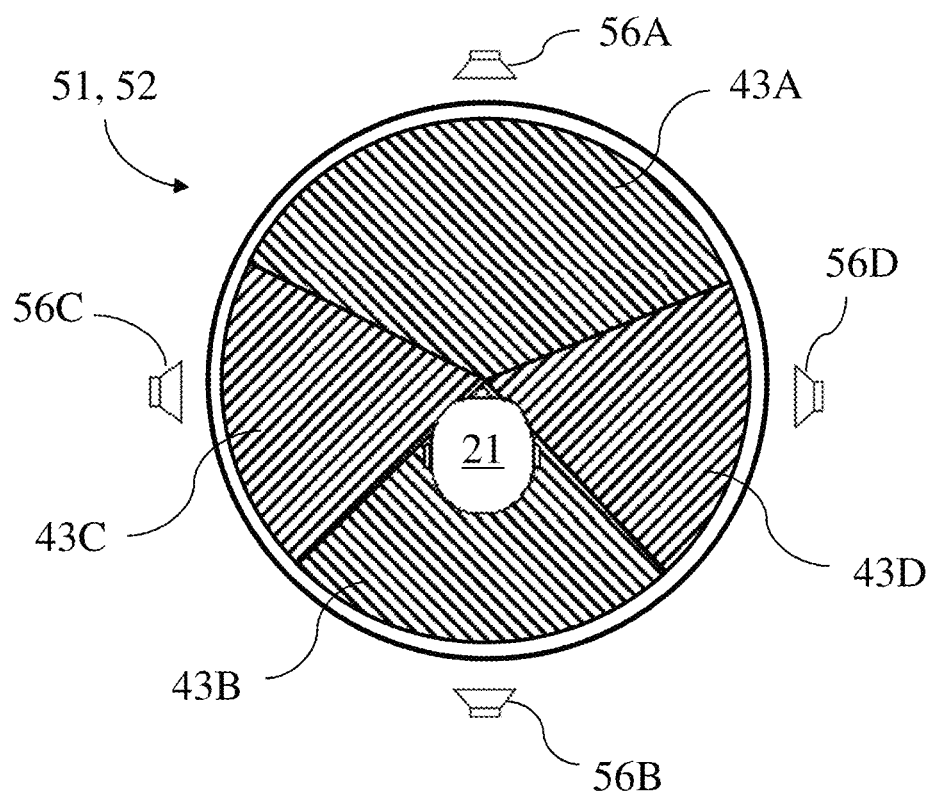
FIG. 4 is a schematic top view of a particular helmet exploited in the system of FIG. 2 or 3 (on a different scale)
Figure 5:
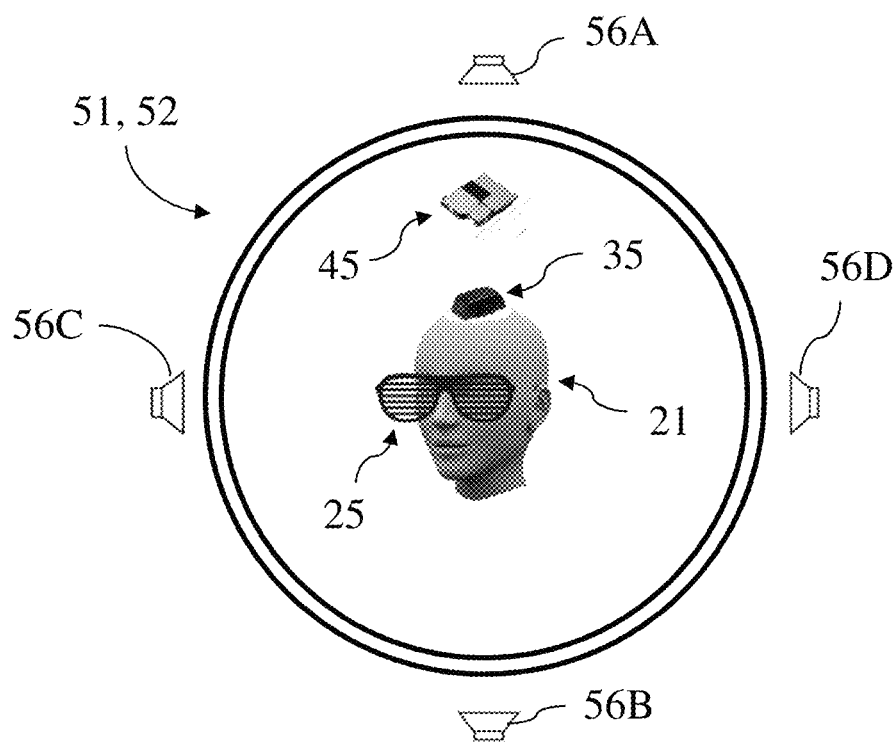
FIG. 5 is a schematic side view of a particular helmet exploited in the system of FIG. 2 or 3 (on a different scale)

The exploitation of the systems of FIGS. 2 and 3 is schematically illustrated on FIGS. 4 and 5, which represent respectively top and side views of particular implementations of the helmet 51 or 52, the assembly 41 or 42 having a particular form 45. As visible on those figures, an audio system is introduced, which comprises five audio speakers 56 including four lateral audio speakers 56A, 56B, 56C and 56D, distributed periodically at a horizontal periphery of the helmet 5 located at the level of the user's ears, and a top audio speaker 56E, located at the upper part of the helmet 5. Those audio speakers 56 are preferably integrated in the helmet 5 (this integration not being represented), so as to generate an appropriate sound field to the user's head 21 inside the helmet 5.

The assembly 45 comprises four picoprojectors projecting lights over four respective angular fields 43 (front field 43A, rear field 43B, left field 43C, right field 43D) covering the whole horizontal circumference of a spherical screen surrounding the user's head 21, the latter being formed by the internal wall of the helmet 5 (FIG. 4).

In the illustrated example, the user 2 is wearing glasses 25 provided with an active shutter. They have both a stereoscopic function, the image projections being adapted thereto, and a capturing function for detecting the positions of the user's eyes. In this respect, the glasses are including markers easily detectable by the cameras of the assembly 45 (and possibly also by the lateral captors 31 or 32, not represented on FIGS. 4 and 5).

The detection operations are still enhanced by a head mounted gyroscope 35, communicating position information to the control apparatus 101 or 102 via wireless transmissions.

The effects of continuously adjusting spatially the immersive visual representations of a virtual scene in function of the positions of the user's eyes are illustrated on FIGS. 6A and 6B.

Two virtual near field objects O1 and O2 are part of a virtual scene represented to the user 2 wearing the helmet 5. Though those objects O1 and O2 are shown external to the helmet 5, since they are perceived as such by the user 2, they are actually generated inside the helmet 5 by image projections over the inner wall. While the position of the user's head 21 varies in time, the representation of the objects O1 and O2 is modified accordingly, in a continuous way, so as to take account of the parallax.

Namely, in a first position of the head 21 (FIG. 6A), one of the objects O1 is almost fully hiding the other object O2. When the user 2 moves then his/her head 21 to the right, while still looking at the same part of the virtual scene, the object O2 is made progressively more visible with respect to the obstructing object O1 (FIG. 6B). The evolutions of the representation available to the user 2 are following the parallax rules, as well known to the skilled person.

In addition, as visible on FIG. 6C, those representations are available to the user 2 through a dimensional vision, thanks to the use of active shutter glasses or lenses. More precisely, a left view and a right view (illustrated respectively with a left ray 26L and a right ray 26R) are determined separately depending on depth information. The shutter system masks alternately one or the other of the user's eyes, depending on the synchronously projected images.

Figure 7A:
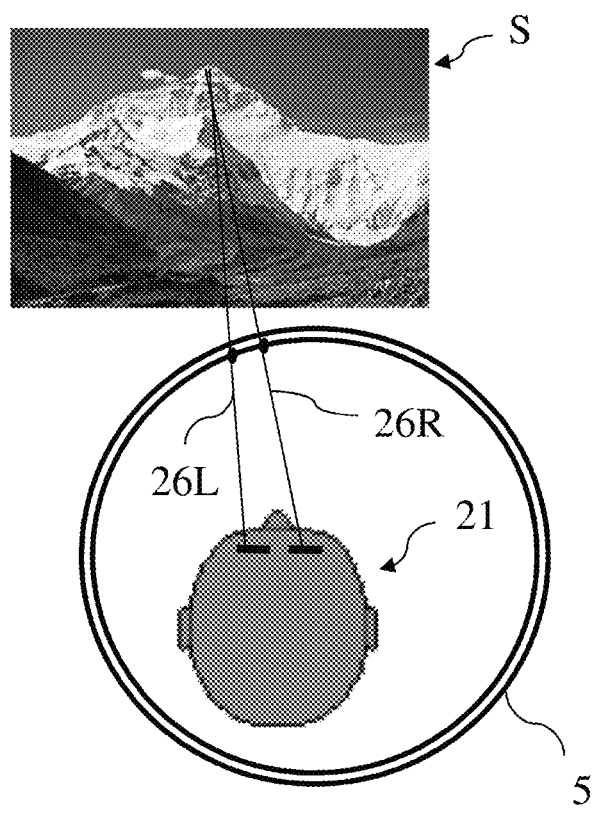
FIGS. 7A and 7B show minor visual representation effects possibly taken into account with the system of FIG. 1.
Figure 7B:
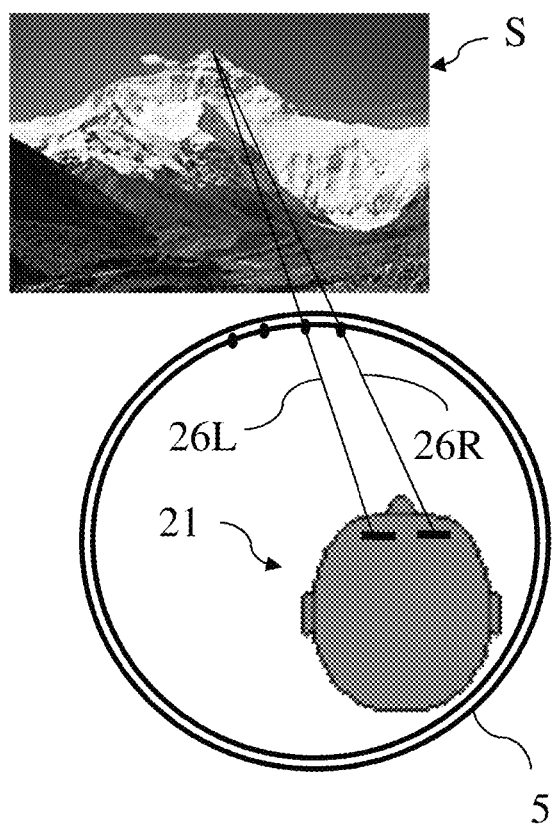

While the parallax effects are particularly significant for near field objects, they are much less for remote objects. This is visible on FIGS. 7A and 7B, on which the user's head 21 is moving in the helmet 5 from one position on the left to another on the right, while looking at a landscape S projected onto the inner wall of the helmet 5. Though the relief is made visible as previously by stereoscopy and the parallax effects are continuously taken into account, the representation of the virtual scene landscape S to the user 2 remains sensibly the same.

Figure 8:
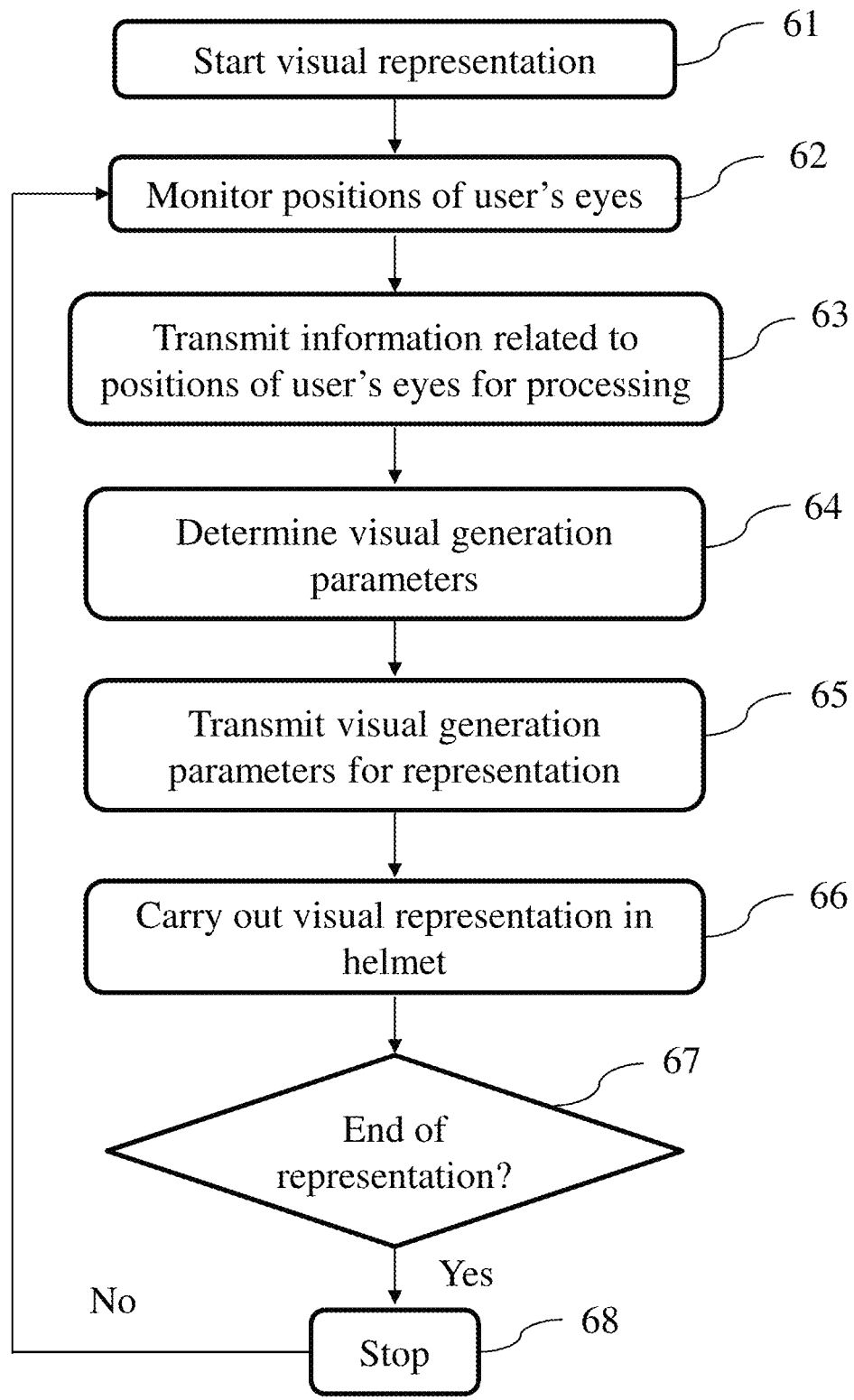
FIG. 8 is a flow chart showing successive steps executed with the system of FIG. 1.

In execution, as illustrated on FIG. 8, the system 10 is preferably operated as follows in immersive visual representations. From a start step 61, triggered e.g. by the user 2 obtaining an immersive video on demand, stored teaching 3D scenes, or shared immersive data (through the virtual scene contents 150), the positions of the user's eyes are regularly monitored (step 62, sensors 3)—which can be effected continuously over time.

The information 110 related to the eyes' positions is transmitted to the device 1 for immersive visual representations (step 63), which determines appropriate visual generation parameters 130 for the representation of the virtual scenes (step 64, module 12), in relation with the considered virtual scene contents 150.

Those visual generation parameters 130 are transmitted to the generation unit 40 with a view to immersive visual representations (step 65), and they are exploited for carrying out the visual representations in the helmet 5 (step 66, generation unit 40 and visual representation generators 4).

Those steps 62, 63, 64, 65 and 66 are repeated, preferably in a continuous way and in parallel over time, until the representations are ended (test step 67, stop step 68), which can happen e.g. at the end of an immersive movie or under request by the user 2.

A particular apparatus 7, visible on FIG. 9, is embodying the device 1 for immersive visual representations and the unit 40 for generating virtual scenes, as described above. It corresponds for example to a GPU computer (for Graphics Processing Unit) integrated in the helmet 5, like the control apparatus 102, or to a tablet, a smartphone, a games console, a microcomputer, a laptop, external to the helmet 5 like the control apparatus 101. That apparatus 7 is suited to immersive reality, which can be virtual reality, augmented reality or mixed reality.

The apparatus 7 comprises the following elements, connected to each other by a bus 75 of addresses and data that also transports a clock signal:
- a microprocessor 71 (or CPU);
- a graphics card 72 comprising several GPUs 720 and a Graphical Random Access Memory (GRAM) 721;
- a non-volatile memory of ROM type 76;
- a RAM 77;
- one or several I/O (Input/Output) devices 74 such as for example a keyboard, a mouse, a joystick, a webcam;

other modes for introduction of commands such as for example vocal recognition are also possible;

a power source 78; and a radiofrequency (RF) unit 79.

The apparatus 7 is adapted to transmit synthesized image or hologram data, calculated and composed in the graphics card, to the visual representation generators 4. In case the apparatus 7 is located inside the helmet 5, this is effected locally in a preferably wired way. A dedicated bus then enables to connect the generators 4 to the graphics card 72, which offers the advantage of having great data transmission bitrates and thus a relatively low latency time for the displaying of images composed by the graphics card.

In case the apparatus 7 is located outside the helmet 5, the transmission is effected remotely, by a cable or wirelessly. The RF unit 79 can be used for wireless transmissions.

It is noted that the word "register" used in the description of memories 721, 76, and 77 designates in each of the memories mentioned, both a memory zone of low capacity (some binary data) as well as a memory zone of large capacity (enabling a whole program to be stored or all or part of the data representative of data calculated or to be displayed). Also, the registers represented for the RAM 77 and GRAM 721 can be arranged and constituted in any manner, and each of them does not necessarily correspond to adjacent memory locations and can be distributed otherwise (which covers notably the situation in which one register includes several smaller registers).

When switched-on, the microprocessor 71 loads and executes the instructions of the program contained in the RAM 77.

The random access memory 77 comprises notably:

in a register 770, the operating program of the microprocessor 71 responsible for switching on the apparatus 7;

in a register 771, parameters representative of the eyes' positions;

in a register 772, parameters representative of the virtual scene contents 150;

in a register 773, the visual generation parameters 130.

Graphical algorithms adapted to generate images and/or holograms as described above are stored in the memory GRAM 721 of the graphics card 72. When switched on and once the parameters 771 and 772 are loaded into the RAM 77, the microprocessor 71 produces the parameters 773. The graphic processors 720 of graphics card 72 load the parameters 772 and 773 into the GRAM 721 and execute the instructions of the algorithms in the form of microprograms of "shader" type using HLSL (High Level Shader Language) language or GLSL (OpenGL Shading Language) for example.

The random access memory GRAM 721 comprises notably:

in a register 7211, the parameters representative of the virtual scene contents 150;

in a register 7212, the visual generation parameters 130.

The immersive scene generated by the graphics card 72 is transmitted to the visual representation generators 4.

As will be understood by a skilled person, the presence of the graphics card 72 is not mandatory, and can be replaced with simpler visualization implementations.

According to another variant, the power supply 78 is external to the apparatus 1.

On the ground of the present disclosure and of the detailed embodiments, other implementations are possible and within the reach of a person skilled in the art without departing from the scope of the invention. Specified elements can notably be interchanged or associated in any manner remaining within the frame of the present disclosure. Also, elements of different implementations may be combined, supplemented, modified, or removed to produce other implementations. All those possibilities are contemplated by the present disclosure.

According to the disclosure, the processor(s) is/are further configured for determining the visual generation parameters so as to spatially adjust continuously that at least one of the immersive visual representations of the virtual scene(s) in function of the positions of the user's eyes.

The continuous spatial adjustment of the immersive representation(s) contrasts notably with the existing technology relying on channel modifications from one display area to another. It opens the way to significant enhancements in visual representations in a helmet, notably for taking account of parallax. In addition, the device of the disclosure can potentially offer a significant movement flexibility, in particular with regards to rotating movements around any axis (including to the left or the right, upwards or downwards) and to translations (including forwards and downwards, as well as lateral).

In the present disclosure, the term "helmet" is encompassing any kind of headgear surrounding at least partly the user's head, notably at the level of the user's eyes, without necessarily having a protection function or a hard structure. Preferably, the helmet is covering a full horizontal circumference.

Though it may appear manifestly implicit that the helmet is configured to be jointly moved by movements of the user, this is an important feature which makes a clear difference with existing technologies in which the user is immersed in a virtual world represented on a fixed support around the user, such as room walls. The terms "jointly moved by movements of the user" are to be interpreted as meaning that when a center of mass of the user body is moving in translation (e.g. walking, sitting down, standing), the helmet is driven accordingly, and when a direction of the user body (which can be defined as the direction towards which the front part of the body is turned) is rotated (e.g. turning around, down or up), the helmet is also driven accordingly.

Of course, the helmet may be maintained unmoved to a limited extent when the user is moving, for example if the user keeps the head back when walking forward, but the driving force due to the user movement makes such an artificial status unstable and quite restricted. Also, some user movements may have no impact on the position of the helmet, for example hand gestures or head tilting inside the helmet. Anyway, the configuration of the helmet is such that at least some movements of the user as recited above necessarily trigger joint helmet movements.

The device can notably enable, in advantageous implementations, to surround the user with a wearable, ball-shaped projection screen, the user having the possibility to move the head independently of the shoulders. In further advantageous implementations, it can detect the user's eyes movements so as to move images projected on an inner screen accordingly, giving the impression of a virtual reality environment while adapting in a fine way the projected images.

The continuous adjustment of the immersive visual representations in function of the positions of the user's eyes appears particularly unexpected for a mobile immersion support jointly moving with the user. This is underpinned by a potential double simultaneous movement, involving the user on one hand, and the user's eyes on the other hand, both being interrelated while further producing autonomous consequences in the VR representations. For example, by walking forward while slightly turning the head on his/her right, the user can move forward in the virtual world while at the same time perceiving an adjusted representation of what is virtually available on the right.

Though the device is particularly relevant to VR, the representations the virtual scene(s) have also applications in the field of augmented reality (AR) and mixed reality (MR), insofar as the virtual scenes can be superimposed over and/or combined with real scenes.

An interesting advantage of the disclosed device is that it allows the presence of multiple users in a same room, or in an open space dedicated to immersive reality (e.g. an outside playing field), without requiring an identical immersive reality for all users. By contrast, since the unit support of the virtual scene can be basically individual, each of the users can have the benefit of a specific, advantageously customized, virtual environment. In addition, the users may be involved in interactive immersive reality experiences, in which what is visualized by one of them depends on, and/or influences, what is visualized by the others. This may be advantageous for video games, as well as for learning, co-working or artistic creation. Also, non-users may be present in the same room or space as users without being disturbed by the immersive environment (e.g. family members). Such non-users can further possibly organize and manage collective virtual events based on the exploitation of multiple devices as disclosed, in an appropriate room or open space.

Depending on the implementations, the device for immersive representations is arranged within the helmet or external to it. In the latter case, the device is advantageously embodied in a dedicated box communicating with a communication unit included in the helmet, whether via wired or wireless transmissions.

The processor(s) is/are advantageously further configured for determining the visual generation parameters also in function of movements of the helmet triggered by at least some of the user's movements.

This enables a combined account of eye movements inside the helmet and of movements of the helmet, as developed below in particular implementations.

More precisely, the processor(s) is/are advantageously configured for locking at least some of the visual generation parameters determined in function of the movements of the helmet, that locking being in relation with part of the immersive visual representation(s) that is disclosed to the user by spatially adjusting continuously the immersive visual representation(s) in function of the positions of the user's eyes and that is targeted by at least one of the movements of the helmet.

By "disclosed to the user", it is meant that the part of the immersive visual representation(s) is made visible, or more visible, to the user by the continuous spatial adjustment, while it was previously hidden or partially hidden to the user due to at least one front virtual object.

The "locking" of some of the visual generation parameters expresses that those parameters, corresponding e.g. to a forward or rotative progression inside the virtual scene, are maintained in later visualization steps.

In some embodiments, while the positions of the user's eyes in the helmet with respect to the helmet are taken into account, movements of the user's eyes together with the helmet are disregarded. For example, if the user turns to a direction with his/her head and torso, so that the helmet fully follows that movement, or if the user moves forwards or backwards, the positions of the eyes may remain sensibly constant with respect to the helmet. Accordingly, those movements have sensibly no effect on the representation of a virtual scene.

In other embodiments, at least some of the positions of the user's eyes are considered in determining the visual generation parameters of the virtual scenes, even when they trigger no changes in the positioning of the user's eyes with respect to the helmet. A combined consideration of the positions of the user's eyes with respect to the helmet on one hand, and of the positions of the user's eyes together with the helmet on the other hand, is then implemented. For example, a movement forwards of the user's eyes with respect to the helmet gets the user closer to a front object represented in a virtual scene, while a displacement forwards of the user's head together with the helmet (as monitored e.g. with accelerators integrated in the helmet) generates a virtual travel forwards of the user in the virtual scene at a particular speed. In another example, a rotation of the helmet with the user (as monitored e.g. with a gyroscope integrated in the helmet) beyond a threshold level triggers a round movement of the represented virtual scene along a spiral path, while a rotation of the user's head with respect to the helmet enables the user to visualize the virtual view around him/her at a given position of that spiral path.

In particular implementations, some helmet movements have no effect on the represented virtual scene (e.g. movements forward or downward), while other helmet movements are determining (e.g. moving forward). In other particular implementations, which can be coupled with the previous ones, the processor is configured for enabling a user to enable, disable or stop effects of helmet movements on the represented virtual scene.

Locking the visual generation parameters in function of the movements of the helmet and in relation with part of the immersive visual representation disclosed to the user by the eyes' positions inside the helmet can provide a very efficient way of discovering, or traveling through, the environment beyond its first appearance.

For example, when by tilting the head or by having a side gaze, the user perceives part of the virtual scene otherwise hidden by closer objects, due to continuous spatial adjustment of the immersive visual representation, the user is enabled to travel forward towards that part (e.g. a person, a house), through that part (e.g. a door) or along that part (e.g. a path) by a movement forward of the helmet, advantageously at a constant traveling speed. Such a movement forward is advantageously effected by a head pulse or by a step forward.

In an alternative implementation (which can also be combined with the previous one), the user is enabled to virtually navigate around that part (e.g. a garden, a gift) or in a curbed way along that part (e.g. a river) by a side movement of the helmet. Such a side movement is advantageously effected by a head pulse or by a user rotation.

In still another example, the locking of the visual parameters is carried out by an instantaneous positioning change of the user in the virtual scene, so that the user has a direct view on the concerned part of the immersive visual representation, or is transposed into that part.

The visual generation parameters are locked in relation with the part of the immersive visual representation revealed by the continuous spatial adjustment, thereby in relation with the positions of the user's eyes when moving the helmet. In this respect, the revealed part is automatically provided a privileged focus for the locking, over neighboring parts of the immersive visual representation. Also, even if the user changes his/her eye positions after the movement is triggered, or scarcely continues to perceive the concerned part during some time intervals, the user traveling or the user positioning stays stable and associated with the disclosed part.

Advantageously, the movement is unlocked by a movement of the helmet opposed to the locking movement—e.g. a backward movement when the locking is associated with a forward movement, or a side movement opposite to the locking side movement.

Combining user actions through eye positions and helmet movements as indicated above can prove particularly flexible and user-friendly and provide a broad range of potentialities in navigating through a static or dynamic virtual scene. In particular, it deserves noting that head movements can possibly be effected by the user in the helmet without disturbing the user positioning in the virtual scene, thereby providing stability while avoiding undesired drifts.

Capturing information related to positions of the user's eyes in the helmet does not necessarily require a separate monitoring of each eye's position.

Thus, in particular embodiments, the information related to the positions of the eyes is based on a position and direction of the user's head with respect to the helmet. That information is then advantageously at least partly based on a tilting of the user's head with respect to the helmet. Indeed, taking account of head tilting proves particularly determining for the user perception of realism in visual representation. This appears to be due to the importance of such movements with respect to parallax.

In other embodiments, monitoring the position of a unique eye is enough, the position of the other eye being induced therefrom.

In alternative embodiments, which can also be combined with the previous ones, the information related to the positions of the eyes is based on eye pupil monitoring.

In advantageous implementations, the processor(s) is/are further configured for receiving information related to a pupil diaphragm of at least one of the eyes, and for determining the visual generation parameters also in function of that information. That information can concern a degree of opening and/or a positioning of the pupil diaphragm.

This implementation can notably enable to induce a level of convergence of the eyes.

In particular modes, the helmet comprising a lower part having an adjustable internal representation space, the processor(s) is/are configured for determining the visual generation parameters in function of the adjustable internal representation space.

The representation space in the helmet can be adjusted notably by the helmet having a fixed upper part and a flexible lower part, the representation space being given by the height of that lower part. In alternative embodiments, the helmet is rigid but is provided with an internal adjustable screen.

Enabling such flexibility in the dimensions of the representation space can allow in particular to balance the user's sensation of immersion with respect to the user's relationship with the real environment.

Preferably, the processor(s) is/are configured for taking account of relative 3D positioning of virtual objects in the virtual scene(s) with respect to the user's eyes in determining the visual generation parameters.

More precisely, the processor is preferably configured for taking account of a parallax of the virtual scene(s) with respect to the user's eyes.

In this way, a stereoscopic effect can in particular be introduced, which strengthens the user's feeling of immersion in a close-to-real virtual environment. Active-shutter glasses or contact lenses can notably be worn by the user.

In advantageous embodiments, the processor(s) is/are configured for determining the visual generation parameters of the virtual scene(s) with respective distinct visual representations for the user's eyes.

In a first category of implementations of the device, the concerned immersive visual representation comprises at least one image projected on an internal wall of the helmet.

The term "wall" applies generally in the present disclosure to an outer layer of a structure, which can be—and is generally—curved.

In a second category of implementations of the device, the concerned immersive visual representation comprises at least one hologram generated in the helmet.

In addition, the immersive visual representations are preferably dynamic over time.

The disclosure further pertains to an individual head equipment for immersive visual representations to a user of at least one virtual scene. The individual head equipment comprises:
- a helmet adapted to the immersive visual representations to the user in the helmet, that helmet enabling head movements of the user in the helmet while being configured to be jointly moved by movements of the user,
- at least one visual generation apparatus configured for representing to the user the virtual scene(s) in the helmet,
- at least one sensor configured for capturing information related to positions of the user's eyes in the helmet with respect to the helmet.

The visual generation apparatus is/are configured for carrying out at least one of the immersive visual representations of the virtual scene(s) in the helmet based on the information related to the positions of the user's eyes.

According to the disclosure, the visual generation apparatus comprise(s) a device compliant with any of the preceding implementations.

In this respect, the visual generation apparatus is/are adapted to spatially adjust continuously the at least one of the immersive visual representations of the virtual scene(s) in function of the positions of the user's eyes.

In particular embodiments, the helmet has a shape selected among a spherical shape and a cylindrical shape.

According to particular implementations, the helmet has a first state in which it is opaque to a real external world and a second state in which it is at least partly transparent or translucent.

Those implementations are particularly well adapted to immersive AR, since the presence of CG contents can appear to the user as superimposed to the vision of the real environment.

They are also interesting for remaining connected to the external world, for example for having face-to-face exchanges with friends, colleagues or game partners while having access to a virtual surrounding environment. In addition, that virtual environment is advantageously shared between users seeing each other while wearing respectively individual head equipment as presently disclosed.

In advantageous embodiments, the helmet comprises a lower part having an adjustable height, the visual generation apparatus being adapted to the height of that lower part.

Such an adjustable height can e.g. rely on an extension mechanism similar to those used for rolling up and down window shades. It can be obtained by an electrically controlled or a manually controlled mechanism.

In addition, the height of the lower part determines an effective opening size for representation, which can be driven between a minimum opening size, which can e.g. amount to an almost full globe, and a maximum opening size, leaving e.g. just enough projection space from the level of the user's eyes upwards.

An advantage of such embodiments consists in making possible to the user the processing of real-world tasks at a lower part while being provided with immersive virtual contents in an upper part. The real-world tasks can e.g. consist in watching documents or typing on a keyboard.

In a first category of embodiments, the individual head equipment comprises a supporting part enabling to have the helmet carried on the user's shoulders via at least one supporting part.

That category may offer a high freedom of movement to the user, and be quite convenient to exploit. Preferably, however, the equipment has specially selected features, including dimensions, materials and/or projection or hologram generation units, so as to avoid an excessive weight for the user.

In a second category of embodiments, the individual head equipment comprises a link of the helmet to an upper suspension system.

That category enables heavier equipment than the first category, thus possibly more sophisticated items or more efficient materials and projection or hologram generation units, without being burdensome to the user. In fact, the latter may even be relieved of any load, so that a very long immersive running is made possible.

According to an advantageous mode of the upper suspension system, it comprises at least one string.

The string(s) can be notably coupled with guide rails mounted on a room ceiling, which leaves the user free of movement in the room. In variants, the string is attached to a vertical bar standing on a floor, which may consist in a lighting device.

In variants, the upper suspension system comprises at least one robotic arm, which keeps advantageously a positioning of the helmet around the user's head based on the detection of head movements inside the helmet.

In advantageous embodiments, the visual generation apparatus is/are configured for respective distinct visual representations for the user's eyes.

Preferably, the distinct visual representations for the user's eyes take account of a parallax of the virtual scene(s) with respect to the user's eyes.

This consideration potentially brings significant realism in the user immersive perception.

An audio system is preferably integrated in the helmet, e.g. with distributed audio speakers, so as to strengthen the immersion sensation for the user. Namely, combining vision and hearing signals provides a mutual reinforcement of their respective effects.

The disclosure also regards a method for immersive visual representations to a user of at least one virtual scene inside a helmet, that helmet enabling head movements of the user in the helmet while being configured to be jointly moved by movements of the user. The method comprises:
  receiving information related to positions of the user's eyes in the helmet with respect to the helmet,
  determining visual generation parameters of the virtual scene(s) in function of the information related to the positions of the user's eyes with respect to the helmet, the visual generation parameters being adapted to represent the virtual scene(s) seen by the user in the helmet,
  providing the visual generation parameters for carrying out at least one of the immersive visual representations of the virtual scene(s) in the helmet based on the visual generation parameters.

According to the disclosure, the method comprises determining the visual generation parameters so as to spatially adjust continuously that at least one of the immersive visual representations of the virtual scene(s) in function of the positions of the user's eyes.

The method is preferably executed by a device as recited above, in any of its embodiments.

In addition, the disclosure relates to a computer program for immersive visual representations, comprising software code adapted to perform a method compliant with any of the above execution modes when the program is executed by a processor.

The present disclosure further pertains to a non-transitory program storage device, readable by a computer, tangibly embodying a program of instructions executable by the computer to perform a method for immersive visual representations compliant with the present disclosure.

Such a non-transitory program storage device can be, without limitation, an electronic, magnetic, optical, electromagnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM (read-only memory), an EPROM (Erasable Programmable ROM) or a Flash memory, a portable CD-ROM (Compact-Disc ROM).

What is claimed is:

1. A device for immersive visual representations to a user of at least one virtual scene inside a helmet, said helmet enabling head movements of said user in said helmet while being configured to be jointly moved by movements of said user, said helmet comprising:
  a lower part having an adjustable height and at least one visual generation apparatus adapted to the height of said lower part, said at least one visual generation device comprising at least one processor configured for:
  receiving information related to positions of the user's eyes in said helmet with respect to said helmet,
  determining visual generation parameters of said at least one virtual scene in function of said information related to said positions of said user's eyes with respect to said helmet, said visual generation parameters being adapted to represent said at least one virtual scene seen by said user in said helmet,
  providing said visual generation parameters for carrying out at least one of said immersive visual representations of said at least one virtual scene in said helmet based on said visual generation parameters,
  wherein said at least one processor is further configured for determining said visual generation parameters so as to spatially adjust continuously said at least one of said immersive visual representations of said at least one virtual scene in function of said positions of said user's eyes.

2. The device for immersive visual representations according to claim 1, wherein said at least one processor is further configured for determining said visual generation parameters also in function of movements of said helmet triggered by at least some of said movements of said user, and for locking at least some of said visual generation parameters determined in function of said movements of said helmet, said locking being in relation with part of said at least one of said immersive visual representations that is disclosed to said user by spatially adjusting continuously said at least one of said immersive visual representations in function of said positions of said user's eyes and that is targeted by at least one of said movements of said helmet.

3. The device for immersive visual representations according to claim 1, wherein said at least one processor is configured for taking account of relative 3D positioning of virtual objects in said at least one virtual scene with respect to said user's eyes in determining said visual generation parameters.

4. The device for immersive visual representations according to claim 1, wherein said at least one of said immersive visual representations comprises at least one image projected on an internal wall of said helmet.

5. The device for immersive visual representations according to claim 1, wherein said at least one of said immersive visual representations comprises at least one hologram generated in said helmet.

6. An individual head equipment for immersive visual representations to a user of at least one virtual scene, said individual head equipment comprising:
   a helmet adapted to said immersive visual representations to said user in said helmet, said helmet enabling head movements of said user in said helmet while being configured to be jointly moved by movements of said user,
   at least one visual generation apparatus configured for representing to said user said at least one virtual scene in said helmet,
   at least one sensor configured for capturing information related to positions of the user's eyes in said helmet with respect to said helmet,
   said at least one visual generation apparatus being adapted to carry out at least one of said immersive visual representations of said at least one virtual scene in said helmet based on said information related to said positions of said user's eyes,
   wherein said at least one visual generation apparatus comprises a device for immersive visual representations according to claim 1.

7. The individual head equipment according to claim 6, wherein said helmet has a first state in which said helmet is opaque to a real external world and a second state in which said helmet is at least partly transparent or translucent.

8. The individual head equipment according to claim 6, wherein said individual head equipment comprises at least one supporting part enabling to have said helmet carried on the user's shoulders via said at least one supporting part.

9. The individual head equipment according to claim 6, wherein said individual head equipment comprises a link of said helmet to an upper suspension system.

10. A method for immersive visual representations to a user of at least one virtual scene inside a helmet, said helmet enabling head movements of said user in said helmet while being configured to be jointly moved by movements of said user, said helmet comprising a lower part having an adjustable height and at least one visual generation apparatus adapted to the height of said lower part, so as to perform said method comprising:
   receiving information related to positions of the user's eyes in said helmet with respect to said helmet,
   determining visual generation parameters of said at least one virtual scene in function of said information related to said positions of said user's eyes with respect to said helmet, said visual generation parameters being adapted to represent said at least one virtual scene seen by said user in said helmet,
   providing said visual generation parameters for carrying out at least one of said immersive visual representations of said at least one virtual scene in said helmet based on said visual generation parameters,
   wherein said method comprises determining said visual generation parameters so as to spatially adjust continuously said at least one of said immersive visual representations of said at least one virtual scene in function of said positions of said user's eyes.

11. The method according to claim 10, wherein determining said visual generation parameters is performed also in function of movements of said helmet triggered by at least some of said movements of said user, and for locking at least some of said visual generation parameters determined in function of said movements of said helmet, said locking being in relation with part of said at least one of said immersive visual representations that is disclosed to said user by spatially adjusting continuously said at least one of said immersive visual representations in function of said positions of said user's eyes and that is targeted by at least one of said movements of said helmet.

12. The method according to claim 10, wherein it takes account of relative 3D positioning of virtual objects in said at least one virtual scene with respect to said user's eyes in determining said visual generation parameters.

13. The method according to claim 10, wherein said at least one of said immersive visual representations comprises at least one image projected on an internal wall of said helmet.

14. A computer program embodied on a non-transitory computer readable medium for immersive visual representations, comprising software code adapted to perform a method compliant with claim 10 when the program is executed by a processor.

* * * * *